(12) United States Patent
Lamarca et al.

(10) Patent No.: US 8,549,418 B2
(45) Date of Patent: Oct. 1, 2013

(54) PROJECTED DISPLAY TO ENHANCE COMPUTER DEVICE USE

(75) Inventors: Anthony G. Lamarca, Seattle, WA (US); Matthal Philipose, Seattle, WA (US); Beverly L. Harrison, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 12/646,607

(22) Filed: Dec. 23, 2009

(65) Prior Publication Data
US 2011/0154233 A1   Jun. 23, 2011

(51) Int. Cl.
*G06F 3/048* (2006.01)

(52) U.S. Cl.
USPC ............................ 715/764; 353/28; 353/69

(58) Field of Classification Search
USPC ................... 715/764, 863; 345/157; 353/28, 353/69
See application file for complete search history.

(56) References Cited

U.S. PATENT DOCUMENTS

| | | | | |
|---|---|---|---|---|
| 5,114,224 A * | 5/1992 | Miyamoto et al. | ............ | 353/122 |
| 5,278,596 A * | 1/1994 | Machtig | ........................ | 353/122 |
| 5,528,263 A * | 6/1996 | Platzker et al. | ............... | 345/156 |
| 6,353,428 B1 * | 3/2002 | Maggioni et al. | ............ | 345/157 |
| 6,431,711 B1 * | 8/2002 | Pinhanez | ........................ | 353/69 |
| 6,793,350 B1 * | 9/2004 | Raskar et al. | ................. | 353/121 |
| 6,866,390 B2 * | 3/2005 | Belliveau | ..................... | 353/122 |
| 7,348,963 B2 * | 3/2008 | Bell | .............................. | 345/156 |
| 7,755,608 B2 * | 7/2010 | Chang et al. | ................... | 345/157 |
| 8,255,531 B2 * | 8/2012 | Bose et al. | ..................... | 709/224 |
| 8,385,971 B2 * | 2/2013 | Rhoads et al. | ............. | 455/556.1 |
| 2003/0202156 A1 * | 10/2003 | Connelly et al. | ................ | 352/40 |
| 2004/0102247 A1 * | 5/2004 | Smoot et al. | .................... | 463/36 |
| 2004/0183775 A1 * | 9/2004 | Bell | .............................. | 345/156 |
| 2005/0128437 A1 * | 6/2005 | Pingali et al. | ..................... | 353/69 |
| 2006/0010400 A1 * | 1/2006 | Dehlin et al. | .................. | 715/856 |
| 2006/0178212 A1 * | 8/2006 | Penzias | ............................. | 463/37 |
| 2006/0187196 A1 * | 8/2006 | Underkoffler et al. | ........ | 345/156 |
| 2007/0076862 A1 * | 4/2007 | Chatterjee et al. | ....... | 379/433.06 |
| 2007/0222734 A1 * | 9/2007 | Tran | ................................ | 345/98 |
| 2008/0062257 A1 * | 3/2008 | Corson | ........................... | 348/47 |
| 2008/0143975 A1 * | 6/2008 | Dennard et al. | ................ | 353/42 |
| 2009/0271104 A1 | 10/2009 | Letchner et al. | | |

OTHER PUBLICATIONS

Pingali et al., Steerable Interfaces for Pervasive Computing Spaces; Jan. 2003; IEEE; pp. 1-8.*
Pinhanez et al.; Transforming Surfaces into Touch-Screens; Dec. 2001; IBM Research Report; Whole document.*
Kjeldsen et al.; Interacting with Steerable Projected Displays; May 2002; IBM Research Center; Whole Document.*

(Continued)

*Primary Examiner* — Phenuel Salomon
(74) *Attorney, Agent, or Firm* — Blakely, Sokoloff, Taylor & Zafman LLP

(57) ABSTRACT

Methods, apparatuses and systems to receive, via at least one sensor device, data related to an area around the at least one sensor device. A target area around the sensor device to project an interactive display space via a projector is determined based, at least in part, on the data received from the at least one sensor device. The target area will include a projected interactive display space wherein interactions and objects within the projected interactive display space are to be processed via a computing device operatively coupled to the at least one sensor device.

14 Claims, 7 Drawing Sheets

(56) References Cited

OTHER PUBLICATIONS

Borchers, Jan, et al., "Stanford Interactive Workspaces: A Framework for Physical and Graphical User Interface Prototyping", Computer Science Department, Stanford University, (Apr. 5, 2002, pp. 1-13.

Kane, Shaun K., et al., "Bonfire: A Nomadic System for Hybrid Laptop-Tabletop Interaction", University of Washington; Everyday Sensing and Perception Group, Intel Research Seattle, Oct. 4-7, 2009, (Oct. 4, 2009), pp. 129-138.

Wellner, Pierre. "The DigitalDesk Calculator: Tangible Manipulation on a Desk Top Display", University of Cambridge Computer Laboratory and Rank. Xeros EuroPARC: Nov. 11-13, 1991, (Nov. 11, 1991), pp. 27-33.

\* cited by examiner

PROJECTED DISPLAY TO ENHANCE COMPUTER DEVICE USE

FIELD

Embodiments of the present invention generally pertain to devices and methods to provide enhanced computer device interaction and more specifically to projection-based smart spaces, mobile device projection systems, tabletop systems, and processing physical interaction.

BACKGROUND

Use of computer systems via standard input/output devices—i.e., the screen, mouse, and keyboard, can restrict a user's interaction with the computer system. Prior art methods for enhancing user interactions with computer have limitations that prevent convenient and enriching user experiences.

A fixed projector has been utilized to project graphical elements in the space around a desktop computer, but the fixed projector requires calibration in order to adjust the image dimensions and skew.

Other systems project graphical elements and enhance input/output capabilities via additional hardware (e.g., cursors/icons projected on to a tablet monitor or a touch-display tabletop), but these systems require additional and specific devices/hardware for the user to provide input and output to a desktop or fixed computer system.

None of the above solutions provide enhanced user interaction for a mobile computer system, wherein the mechanisms to enhance interaction are self-contained in the mobile computing system.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
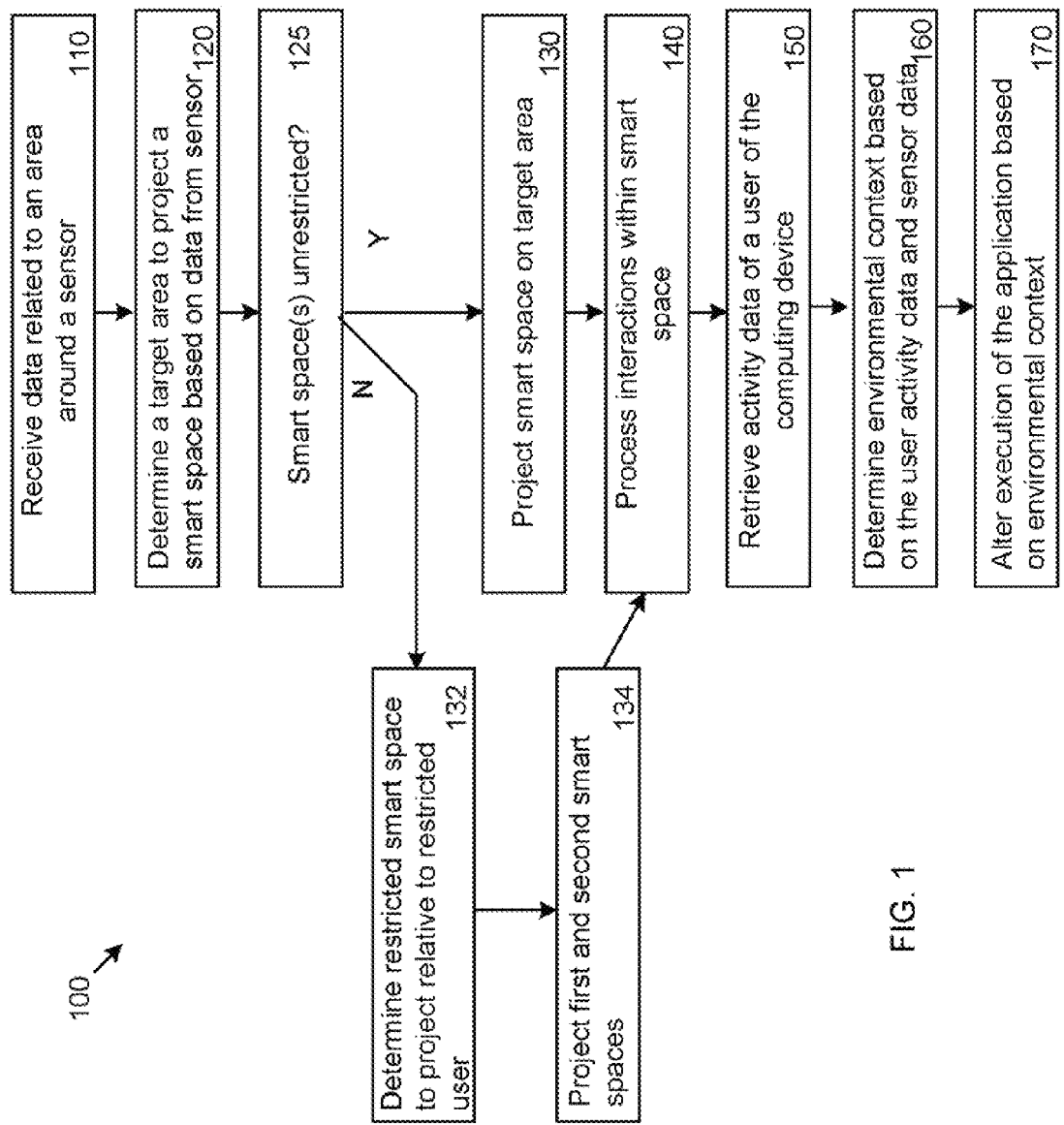
FIG. 1 is a flow diagram of an embodiment of a process for generating and displaying an interactive smart space.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the present invention describe a self-contained, portable/mobile computing system able to dynamically establish and project an interactive display space. Embodiments of the present invention may be represented as a process to determine how and where to project an interactive display space and to execute further operations based on interactions captured within said interactive display space.

A projected interactive display space, or "smart space," as referred to herein, describes a projected space peripheral to a mobile computer. A smart space extends user interaction with said mobile computer. Thus, embodiments of the invention are directed towards augmenting user interaction of a portable computer via a dynamically established area (e.g., on a desk, table, or other relatively flat surface). Said augmented interaction may be enabled by processing related to user hand gesture recognition, object recognition, and object manipulation recognition within the smart space(s).

Embodiments of the invention combine the utility of a laptop's screen, keyboard, and computing power with the natural input, extended space, and object-awareness of projected and perceived peripheral displays. Any stable surface within the periphery of a mobile computer, e.g. a tabletop, may be used to project the smart space. Surfaces such as tabletops lack the high input bandwidth afforded by a keyboard and mouse, while mobile computers lack surfaces for sketching, gesture, peripheral display, and sensing physical objects; however, together these devices can augment each other in useful ways and ameliorate each other's weaknesses. In one embodiment, micro-projectors are integrated with standard laptop components to provide a large interaction space without significantly increasing the laptop's size and weight, as with prior art multi-display laptops.

Embodiments of said smart spaces may detect activity within the laptop periphery. Logic may further determine the appropriate response to said activity. The term "logic" used herein may be used to describe software modules, hardware modules, special-purpose hardware (e.g., application specific hardware, application specific integrated circuits (ASICs), digital signal processors (DSPs)), embedded controllers, hardwired circuitry, etc.

In one embodiment, a computer device augmented by a smart space contains all the necessary logic to execute the processing disclosed herein. In another embodiment, a computer device may communicate with a backend server and/or database to process user and object interaction within a smart space.

Smart spaces may further enable the interaction between physical and digital objects via computer vision, provide a horizontal interactive surface along with the laptop's vertical screen, allow direct pointing, sketching, and gestures, and extend the input/output space to enrich existing applications.

Embodiments of the invention may recognize when users perform explicit interactions with objects within a smart space (e.g., placing a document within a projected area in order to scan it) and implicit interactions with objects to determine information about the user's current state (e.g., recognizing the user's eyeglasses on the table to determine that the user is not wearing them, and therefore adjusting the display of a laptop to account for the user's impaired vision).

Embodiments use computer vision techniques to recognize objects in the projection space and to track hands and hand gestures on the table. These techniques may be implemented using the Intel® OpenCV computer vision libraries and Python™ 2.5.

Variations in lighting and surface material affect both the recognition and projection systems. Embodiments of the invention may mitigate the severity of these variations using a combination of the following approaches. The system attempts to adapt automatically to changing conditions, e.g., through adaptive background subtraction. In one embodiment, the camera input is used to perform adaptation. In another embodiment, the projected area may be adapted based on dedicated sensors for detecting the surface material or could even adapt based on location. In another embodiment, the system may implement lightweight, user-driven calibration steps (e.g., hand-color training). In another embodiment, the system may utilize a suitable choice of graphical and textual elements and color schemes to make the projection area visible even under difficult lighting conditions.

FIG. 1 is a flow diagram of an embodiment of a process for generating and displaying an interactive smart space. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible. Elements of the flow diagram below may be executed via a processor or other appropriate hardware devices (e.g., a processor may cause a projector to project a smart space).

Process 100 illustrates that data related to an area around at least one sensor device may be received, 110. The at least one sensor may include an optical lens and a microphone and an accelerometer, and thus the data may include an image of the area around the sensor, or audio data captured nearby or patterns of tapping vibration on the surface.

A target area around the sensor device to project a smart space via a projector is determined based, at least in part, on the data received from the at least one sensor device, 120. For example, sensor data may comprise an image of an area including a table top and a wall, and a target area may be determined to be a space on either the table top or wall. Furthermore, audio data may indicate whether the sensor is near a suitable projected area, and may further determine an optimal target area (e.g., audio data captures noise from a crowd of people, and it is determined that, to limit visibility of a smart space, a target area on the table top is better than a target area on a wall). Optimal size of the target area may also be determined by sensor data (e.g., available space on the table top).

If a single smart space or multiple smart spaces without restrictions on use is to be projected, 125, then the smart space may be projected onto the target area around the sensor, 130. If more than one smart space is to be projected and to be used by more than one user, wherein the second smart space is restricted with respect to the first smart space (e.g., activity to be processed within the second smart space is restricted with respect to the first smart space, projected content of the second smart space is restricted with respect to the first smart space), 125, then a second target area to project a second smart space with respect to the restricted user is determined, 132. The first smart space may then be projected onto the first target area around the computing device and the second smart space onto the second target area around the computing device, 134.

Interactions within any projected smart space are to be processed via a computing device operatively coupled to the at least one sensor device, 140. In one embodiment, the sensor and the projector are operatively coupled via a network to the computing device. In another embodiment, the sensor and the projector are included in the computing device and operatively coupled via a system bus. The smart space may be projected in tandem with the display of the computing device. The processing of interactions within the projected smart space may include general hand gesture recognition processing, object recognition processing, recognizing manipulations being performed on the object, and recognizing hand gestures being performed in relation to particular projected graphical interface components. Projecting the smart space onto the target area around the sensor may include processing to determine surface properties of the target area and calibrating the projection of the smart space based on the surface properties of the target area.

Activity data of a user of the computing device may be retrieved, 150. This may include user history data, an appointment calendar, current location coordinates, or stored data related to user tasks. An environmental context of the execution of the application may be determined based, at least in part, on the user activity data and the data captured via the one or more sensors, 160. Said context may include at least one of an identity of an environment of the user of the computing device, an identity of the user activity. In one embodiment, the one or more sensors may include a Global Positioning System (GPS) device, and the environmental context of the execution of the application may be further based on the data from the GPS device. In another embodiment, cell phone tower triangulation or wi-fi based triangulation is used to determine location.

In one embodiment, the time when the data capture occurred is determined, wherein the determination of the environmental context of the execution of the application is further based on the time when the data capture occurred. The execution of the application may be altered based, at least in part, on the environmental context of the execution of the application, 170. For example, if the environment is determined to be a public place, an application outputting audio data may be muted.

Figure 2:
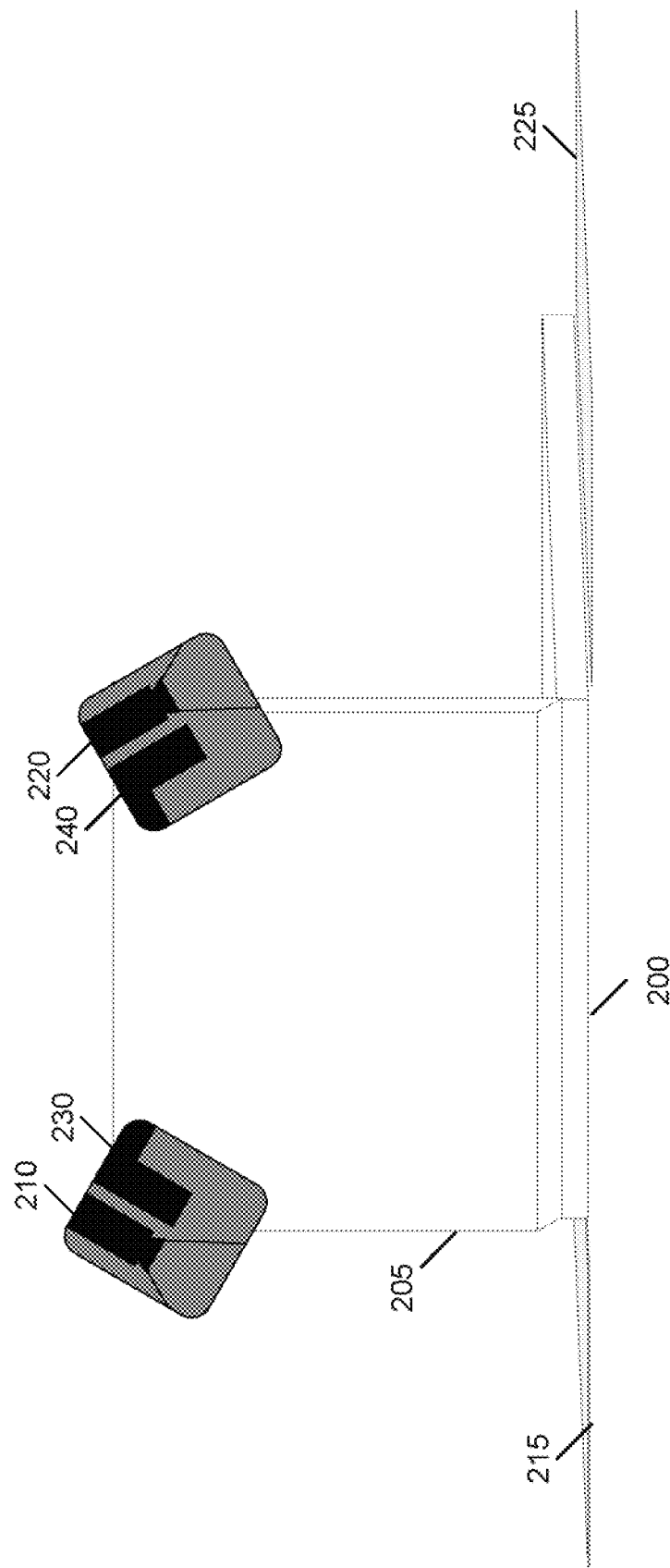
FIG. 2 illustrates a system or apparatus projecting two smart spaces on opposing sides of a mobile computing device.

FIG. 2 illustrates a system or apparatus projecting two smart spaces on opposing sides of a mobile computing device. In one embodiment, as illustrated in FIG. 2, laptop 200 (and components of laptop 200, such as a CPU, I/O devices, system memory, additional processing modules) is operatively coupled to micro-projectors 210 and 220, positioned on opposing sides of laptop 200. Projectors 210 and 220 may be used to project smart spaces 215 and 225 respectively.

Projectors using laser-scanning technology rather than a lens may be used to project the smart spaces, as these types of projectors may provide a relatively bright image that is always in focus under varying lighting conditions.

Laptop 200 is further operatively coupled to cameras 230 and 240, each capable of observing user actions and objects in the projected smart spaces. The cameras and projectors may be connected to the computer via a combination of a small, powered USB hub and the laptop's VGA input or an EVGA UV Plus USB external graphics adapter. In another embodiment, the cameras and projectors may be included in the laptop (e.g., on the sides and back of laptop display 205). In another embodiment, the input optics may be incorporated into the laser optics using a single chip MEMs solution.

A projection-calibration step may be executed to correct initial distortions in the projected smart spaces. The projection area of smart spaces 215 and 225 may be affected by the height of laptop display 205. In another embodiment, where projectors 210 and 220 are physically embedded in the screen's frame, the volume that the projection components may occupy is restricted and thus preventing, for example, the use of multiple reflections. Automatic projector calibration using camera-based computer vision may be executed via methods known in the art. Subsequent processing may correct projection distortion by computing the homography between the distorted projection, the camera image, and the table surface using techniques known in the art. Thus, projected images in smart spaces 215 and 225 may be pre-distorted so that it appears correct to the user. In one embodiment, the user configures the system by clicking on the four corners of one of the projection areas in view of the respective camera, and then clicking on the four corners of a piece of paper with known dimensions placed on the table. This configuration is stored between uses, but may need to be repeated if laptop screen 205 is tilted significantly from its position.

User action and objects in projected smart spaces 215 and 225 may be observed by cameras 230 and 240 respectively, and subsequently processed by laptop 200. Users can interact with projected surfaces 215 and 225 using their hands. Embodiments of the invention may employ a color-based skin detection algorithm. In each frame, processing may determine a color histogram for each foreground object (other methods for detecting fingers are also possible, e.g., template matching or hand shape matching). An image of the user's hand at startup may be captured to account for skin color variations between users and in different lighting conditions. This image may be used throughout the session.

Once the user's hand is identified, geometric features may be determined to identify individual fingers. Known methods in the art may be used to calculate both the convex hull and convexity defects in the hand image. Fingers are identified as points on the convex hull that are separated by defects. A cursor position may be determined for the projected surface based on the user's hand shape: if a single finger is extended, that point is used as a cursor. Otherwise, the cursor is calculated as the midpoint of the extended fingers, allowing users to interact with display objects using multiple fingers.

Embodiments of the invention may support the following manual input methods for interacting with the projected surface: tapping, dragging, flicking, and crossing.

Tapping:

Recognizing touch-based events typically requires some method for detecting when the user's hand contacts the surface. Infrared or shadow-based tracking systems may not be ideal if cameras 230 and 240 are placed low with respect to projected smart spaces 215 and 225. Taps of a user's fingers may be detected by an on-board accelerometer of laptop 200. Readings from said accelerometer may be monitored, and a finger tap may be registered when the reading is greater than a threshold, determined automatically at startup based on current levels. This accelerometer-based tap detection is not falsely activated by loud sounds. To prevent other actions, such as the user typing, from generating these events, a tap event may be recognized only when both an accelerometer event is detected and when the user's finger is near a target in the camera view (e.g., within projected smart spaces 215 and 225).

Dragging:

Gesture recognition may allow users to drag items across projected smart spaces 215 and 225. Because an accelerometer cannot detect passive contact with the surface, a user gesture may be required to drag items. The dragging gesture begins by tapping the surface, followed by dragging two or more fingers across the surface. This gesture causes draggable projected objects to follow the user's hand. A drag may end when the user closes his hand or reverts to pointing with a single finger. A dragging action by a user may also be used to detect and process sketching/handwriting by the user within the smart space.

Flicking:

Users can perform a flicking gesture by rapidly moving their finger across the surface in some direction. Said accelerometer may be used to detect the start of a flick, and cameras 230 and 240 may be used to track the direction. To maximize detection accuracy, flicking motion detection may be limited to the cardinal directions.

Crossing:

Embodiments of the invention may support interacting with on-screen targets through goal crossing. Crossing is detected by tracking the user's finger as it travels across the surface and through interactive element edge boundaries projected in either of projected smart spaces 215 and 225. Crossing provides an alternative selection method when tapping cannot be easily detected, such as on an unstable surface.

The addition of interactive displays 215 and 225 to laptop 200 provides new display opportunities merely by expanding displayable space. Additionally, having projection areas 215 and 225 on either side of the keyboard allows users to perform secondary interactions on the tabletop while their dominant hand is using the keyboard or touchpad of laptop 200.

The availability of projected areas to either side of the keyboard allows for providing peripheral awareness and maintaining awareness of other people or for keeping track of location-relevant information when the user's primary focus is on the laptop screen.

Embodiments of the projected smart space may provide a notification screen (i.e., a dashboard) where peripheral information can be displayed. The dashboard may appear when the user has not actively used the projected display for several minutes, and it can also be summoned manually. This dashboard can be used to project contextual information, such as status changes posted by contacts on social networking sites. Since the quality of projected text is low, processing may favor graphical information, and direct text-rich information to the computer screen. Tapping on a contact's icon may open the corresponding page on the laptop's screen. Embodiments of the invention could also use knowledge of its location to deliver location-specific peripheral awareness, such as real-time flight departure information.

Said dashboard may further include a graphical element that uses the projection space to display thumbnails of frequently viewed webpages. Embodiments of the invention may detect when the web browser window is active, and automatically displays the list of thumbnails. The user can then tap on a thumbnail to load the specified webpage in the browser.

Embodiments of the invention may augment entertainment activities such as gaming. While many current laptop computers provide fast processors and powerful graphics cards, they are still limited by the size of the laptop screen. Embodiments of projected smart spaces allow a richer gaming experience by providing a greater display space. Massively Multiplayer Online Role-playing Games (MMORPGs) are prime candidates for using this feature, as they typically provide a lot of information on the screen. For example, a computer game may be displayed with the laptop screen used for 3D game navigation and player-to-player communication, and projected displays 215 and 225 would show related game map views and supplementary game information. This setup allows the player to focus on primary game tasks on a laptop screen while remaining aware of overall game state from peripheral projected information.

Figure 3:
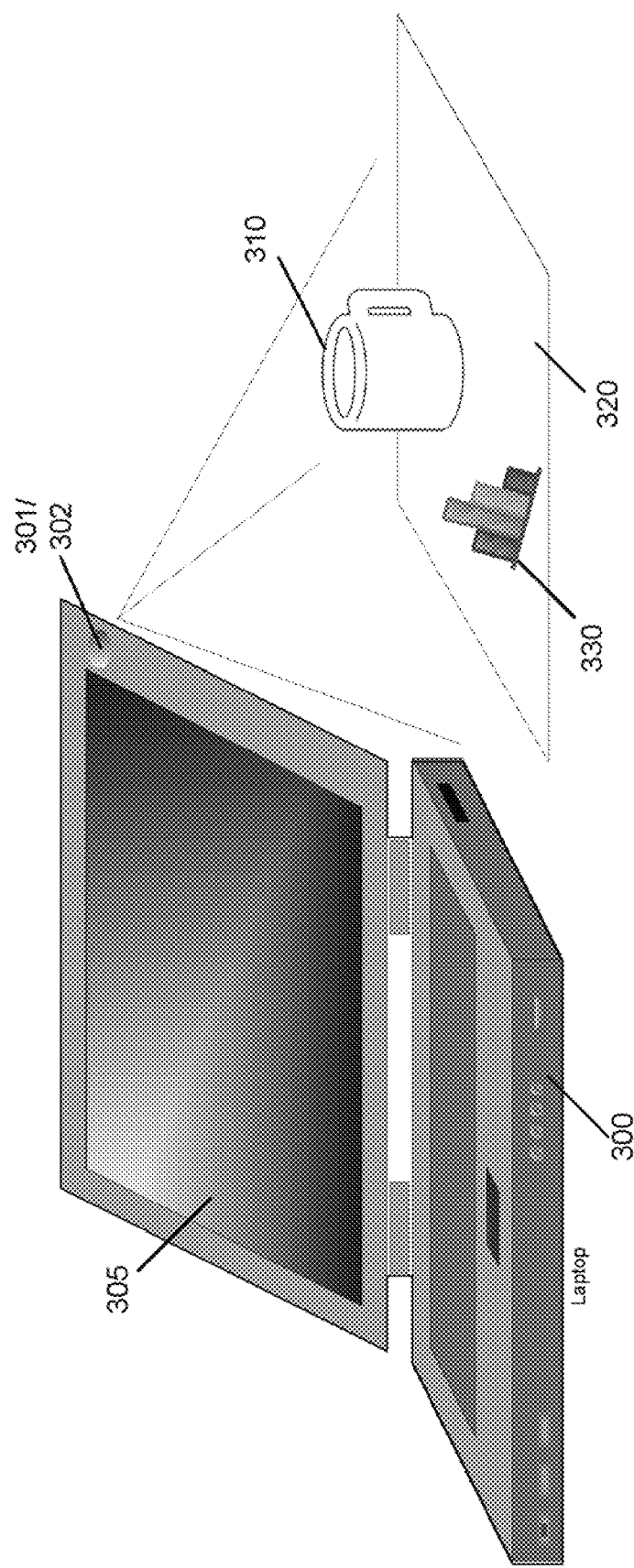
FIG. 3 illustrates how a smart space may include the ability to recognize physical objects in the immediate vicinity of a laptop.

FIG. 3 illustrates how a smart space may have the ability to recognize physical objects in the immediate vicinity of the laptop. For example, a user may be interested in tracking their use or consumption of everyday objects, whether for financial, fitness, environmental, or other purposes. Rather than requiring users to log every use of a specific item, embodiments of the invention can detect the presence of an object in its working area, and can track and report use of that object over time.

For example, a person who is concerned that they are spending too much money at a café might use embodiments of the invention to track their coffee consumption. As illustrated in FIG. 3, when the user places coffee cup 310 within projected smart space 320 (projected via embedded projector 301), cup 310 is automatically recognized (via embedded camera 302). Based on this recognition, an application executing on mobile computer 300 may receive a command to project chart 330, which graphs recent coffee purchases, on smart space 320 next to cup 310, allowing the user to see her coffee expenditure at a glance. Tapping chart 330 opens a more detailed chart on computer display 305. This feature could also be used to share information about an object with another application.

To identify objects on the tabletop, camera 302 may capture an image of the projected smart space and subsequent processing may execute a background subtraction on said camera image. In one embodiment, a mixture of Gaussians is used to model the background. During start-up, camera 302 captures its current view and classifies it as background. Regions that differ from the reference background image are classified as foreground objects. The mixture of Gaussians method may be used in different lighting conditions without any special configuration, and adapts to gradual lighting changes over time, such as the changing light from a window.

An adaptive method to determine whether an object remains in the foreground may be executed by computer 300 to handle cases where the user places items on a surface without intending them to be processed by the vision system. Each time a new object appears in the foreground, processing may be executed in an attempt to recognize it. If the object is not recognized, the object may be incorporated into the background. This allows the user to place an item on the table, such as a book or newspaper, without occluding future interactions in the projection space. A list of these unrecognized objects may be retained in case the user later wishes to use them, e.g., to import as a figure in a paper, or to serve as a visual-search query.

A simple object recognition algorithm based on color histogram matching may be used to detect cup 310. First, the background is subtracted from the captured frame as described earlier. The connected components within the image may be determined and an RGB histogram for each foreground object may be computed. Processing then attempts to match each component to a known object through correlation of the histograms. This method is sufficient for disambiguating small sets of known objects where colors differ, but would not be adequate for recognizing a wide array of objects (this would require, for example, a feature-based object recognition method). Such an object-recognition component may be described as an open-world model. An open-world model allows objects to be classified as "unknown", while a closed-world model will always classify an object as one of a set of known objects. If an object is classified as "unknown", its presence may be recorded but its pixels would be incorporated into the background.

Figure 4:
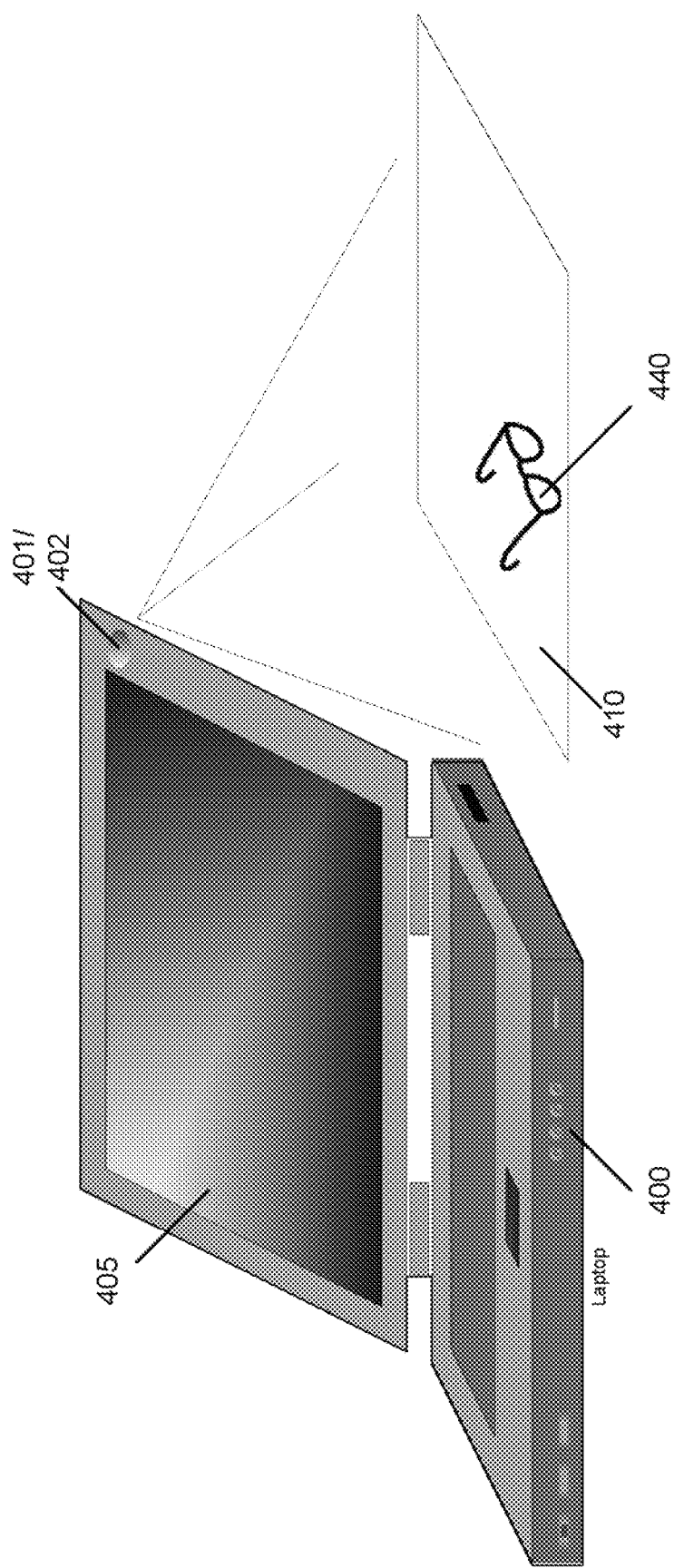
FIG. 4 illustrates an object placed in a smart space triggering an appropriate ambient response.

FIG. 4 illustrates an object placed in a smart space triggering an appropriate ambient response. Embodiments of the invention may use information about the objects around the user to enable subtle interactions. An object being added or removed from projected smart space 410 (projected via embedded projector 401) may cause an adjustment to the settings of applications executed on laptop 400, or to the settings of projected space 410. For example, a user may take off eyeglasses 440 and place them within projected smart space 410. Subsequent processing would recognize eyeglasses 440 and increase the font size on display 405 to allow the user to keep working. This ability to infer the state of the user through objects around the laptop can be easily used to create seamless interaction.

Figure 5:
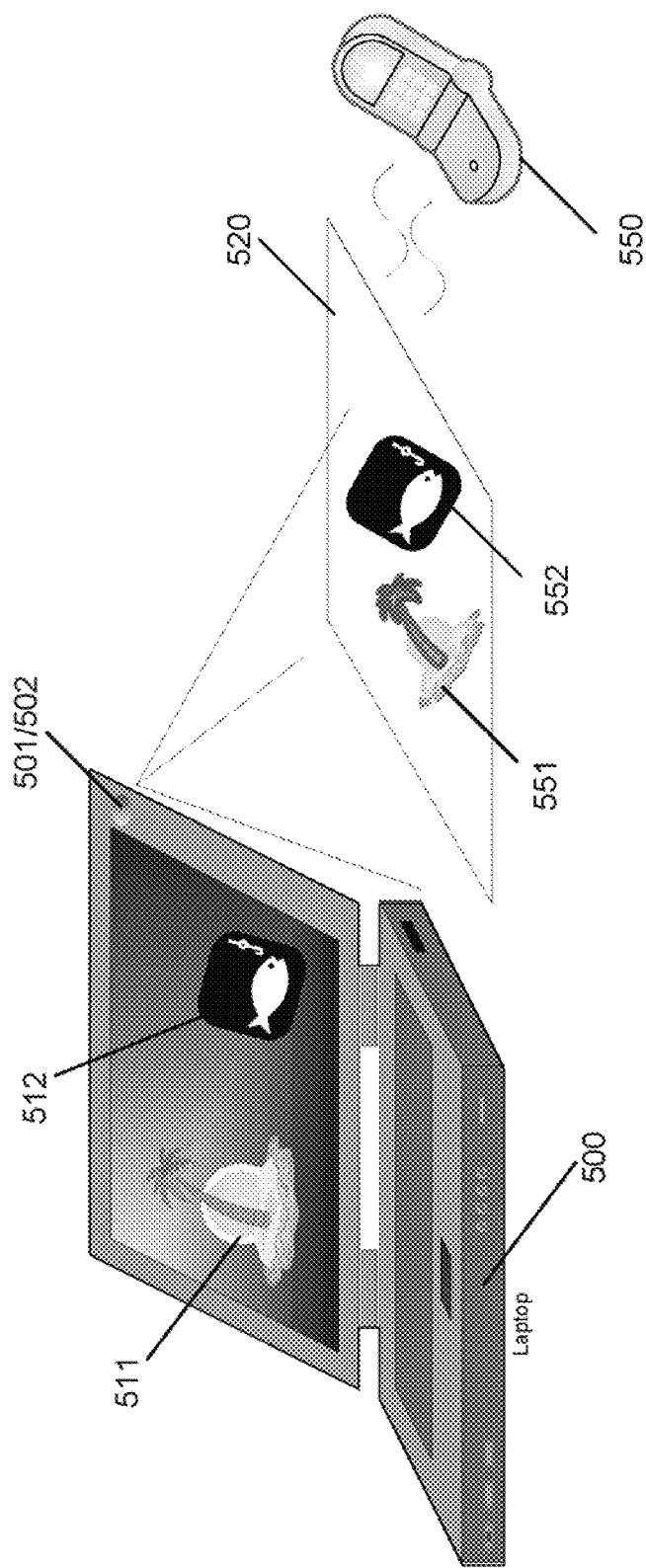
FIG. 5 illustrates augmenting cross-device interaction via a projected smart space.

FIG. 5 illustrates augmenting cross-device interaction via a projected smart space. Related processing may provide the ability to recognize objects and share information between devices in a natural and immediate way. For example, mobile phone 550 may be placed next to projected area 520 (projected via embedded projector 501) and detected by embedded camera 502 (or by BlueTooth protocols). Using a system to pair phone 550 with the laptop 500 would enable transferring photos 551 and 552 (or other information) between the devices. As illustrated in FIG. 5, a user may gesture (e.g., flick) photos 551 and 552 to transfer the photos to an application running on laptop 500 (e.g., photos may be copied and displayed as 511 and 512).

Figure 6:
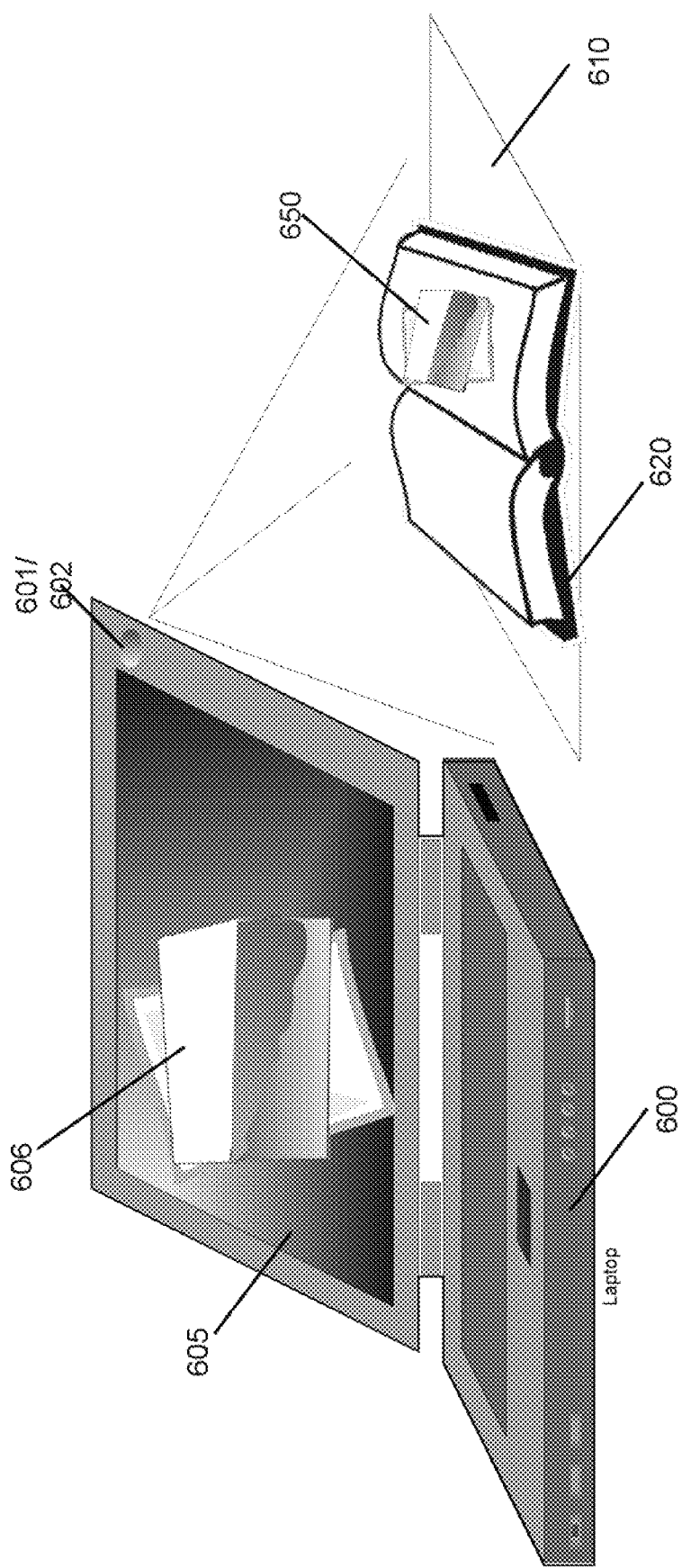
FIG. 6 illustrates object information capture within a projected smart space for use in a computing device.

FIG. 6 illustrates object information capture within a projected smart space for use in a computing device. Embodiments of the invention may be used to observe both computer activity and objects in the proximity of the computer. This ability can be used to provide links between computer tasks and the physical objects that they require. A list of applications that are open on the laptop may be maintained, and this list may be associated with objects detected on the table.

Embodiments of the invention may further allow a user to capture and import image 650 within projected smart space 610. This capability is useful for submitting visual-search queries, for personal logging, or when writing a document. Camera 602 locates image 650 in the foreground, and uses its calibration information to automatically de-skew the image. Computer 600 may then execute a system-wide application (e.g., AppleScript) to insert 650 image into the active program (displayed as image 606), such as an e-mail message or word processing document. In one embodiment, processing will switch resolution of camera 602 as ambient factors dictate (image detail, lighting conditions, etc.).

Figure 7:
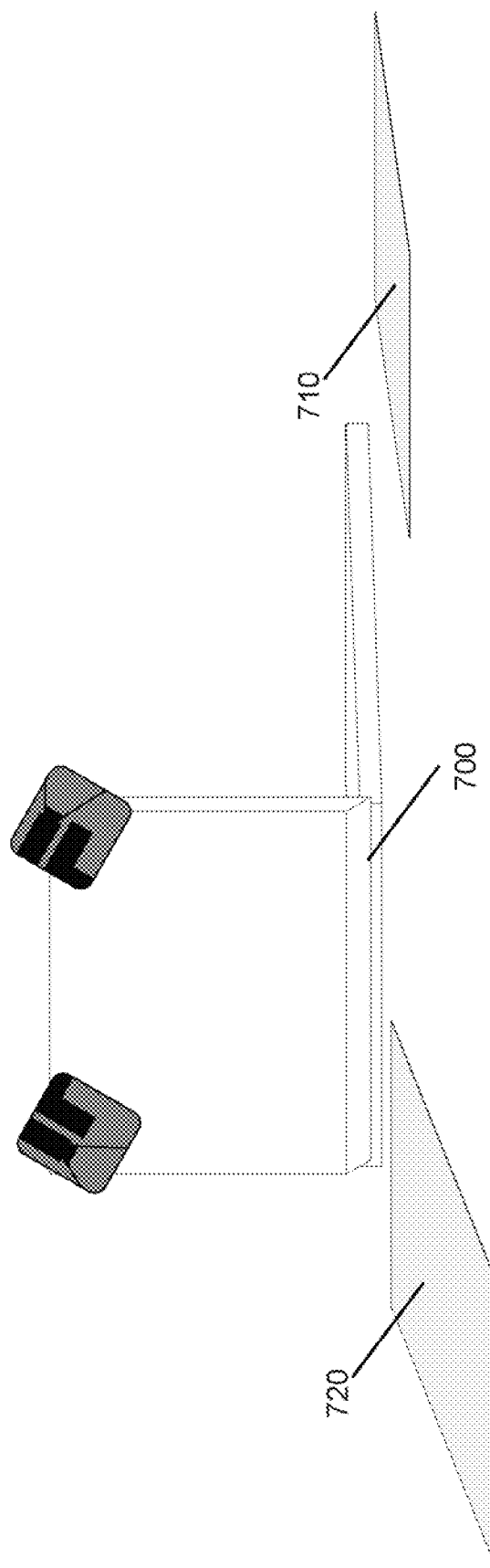
FIG. 7 illustrates multiple projected smart spaces, each of which may have different interactive capabilities.

FIG. 7 illustrates multiple projected smart spaces, each of which may have different interactive capabilities. Projected smart space 710 is oriented toward the user of computer 700, and may not be easily viewable by others. Projected smart space 720 may be oriented away from the user—i.e., publicly projected. Smart space 720 may be restricted with respect to smart space 710. For example, smart space 720 may only display images, and have limited user/object interaction, while smart space 710 may allow user to access and edit data in addition to displaying the images viewable in smart space 720.

Besides what is described herein, various modifications may be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

Various components referred to above as processes, servers, or tools described herein may be a means for performing the functions described. Each component described herein includes software or hardware, or a combination of these. The components can be implemented as software modules, hardware modules, special-purpose hardware (e.g., application specific hardware, ASICs, DSPs, etc.), embedded controllers, hardwired circuitry, etc. Software content (e.g., data, instructions, configuration) may be provided via an article of manufacture including a computer storage readable medium, which provides content that represents instructions that can be executed. The content may result in a computer performing various functions/operations described herein. A computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable storage medium may also include a device or product having content stored thereon at a time of sale or delivery. Thus, delivering a device with stored content, or offering content for download over a communication medium may be understood as providing an article of manufacture with such content described herein.

The invention claimed is:

1. A system included in a mobile computing device and comprising:
   a sensor device to capture a first image data of an area around the mobile computing device and a second image data of a projected interactive display space and an object within the projected interactive display space and not included in the first image data, wherein some user and object interactions within the projected interactive display space are not to be processed via the mobile computing device, and interactions with the object are not to be processed via the mobile computing device;
   a projector to project the interactive display space; and
   projector control logic, communicatively coupled to the sensor device and the projector, to:
analyze the first image data of the area around the mobile computing device to dynamically identify and select a projection surface around the mobile computing device for projecting the interactive display space, including eliminating one or more projection surfaces from being selected based on a context of the user;
determine a target area on the dynamically selected projection surface around the mobile computing device, wherein a size of the target area is determined based, at least in part, on the first image data of the area around the mobile computing device;
send control data to the projector to project the interactive display space onto the target area on the dynamically selected projection surface around the mobile computing device, wherein the interactive display space is to be projected in tandem with a display of the mobile computing device and is to include content different and related to a content of the display of the mobile computing device;
analyze the second image data of the projected interactive display space and the object not included in the first image data to determine surface properties of the target area of the dynamically selected projection surface and properties of the object; and
send control data to the projector to calibrate the projection of the interactive display space for projecting onto the target area and the object based on the surface properties of the target area of the dynamically selected projection surface and properties of the object not included in the first image data.

2. The system of claim 1, further comprising:
   interaction processing logic to process interactions in the projected interactive display space.

3. The system of claim 2, wherein processing of the interactions within the projected interactive display space comprises at least one of hand gesture recognition processing, object recognition processing, or processing to recognize manipulations being performed on an object.

4. The system of claim 3, wherein hand gesture recognition processing includes hand gestures being performed in relation to particular projected graphical interface components of the interactive display space.

5. The system of claim 2, the sensor device to further capture at least one of audio or video data of an area around the system, and the interaction processing logic to further:
   retrieve activity data of a user of the system;
   determine an environmental context of an execution of an application utilizing the interactive display space based, at least in part, on the user activity data and the audio or video data of the area around the system, the context to include at least one of:
   an identity of an environment of the user of the system, and
   an identity of the user activity; and
   alter the execution of the application based, at least in part, on the environmental context of the execution of the application.

6. The system of claim 1, wherein the target area on the dynamically selected projection surface around the sensor device is projected for a first user of the system, the projector control logic to further:
   determine a second target area from the first image data to project a second interactive display space for a second user of the system, wherein the second interactive display space comprises less content than the interactive display space; and
   send control data to the projector to project the second interactive display space onto the second target area.

7. The system of claim 6, wherein the second interactive display space is not projected in tandem with the display of the mobile computing device.

8. An article of manufacture comprising a computer-readable storage medium having instructions stored thereon to cause a processor to perform operations including:
   analyzing a first image data received from a sensor device included in a mobile computing device of an area around the mobile computing device to dynamically identify and select a projection surface included in the first image data of the area around the mobile computing device for projecting an interactive display space, including eliminating one or more projection surfaces from being selected based on a context of the user;
   determining a target area on the dynamically selected projection surface around the mobile computing device to project the interactive display space via a projector included in the mobile computing device, wherein a size of the target area is determined based, at least in part, on the first image data of the area around the mobile computing device;

sending control data to the projector to project the interactive display space onto the target area on the dynamically selected projection surface around the mobile computing device, wherein the interactive display space is to be projected in tandem with a display of the mobile computing device and is to include content different and related to a content of the display of the mobile computing device;

processing some user and object interactions within the projected interactive display space;

analyzing a second image data received from the sensor device of the projected interactive display space projected on the target area of the dynamically selected projection surface and an object within the target area and not included in the first image data to determine surface properties of the target area of the dynamically selected projection surface and properties of the object not included in the first image data, wherein interactions with the object within the projected interactive display space are not to be processed; and sending control data to the projector to calibrate the projection of the interactive display space for projecting onto the target area and the object based on the surface properties of the target area of the dynamically selected projection surface and properties of the object not included in the first image data.

9. The article of manufacture of claim 8, wherein processing user or object interactions within the projected interactive display space includes at least one of hand gesture recognition processing, object recognition processing, or processing to recognize manipulations being performed on an object.

10. The article of manufacture of claim 8, wherein the data received from the sensor device includes audio data, and the processor to further perform operations including:
    determining the context of a user of the mobile computing device based, at least in part, on the audio data.

11. The article of manufacture of claim 8, the processor to further perform operations including:
    receiving accelerometer data from the sensor device; and
    detecting user interactions with the interactive display space from the accelerometer data.

12. The article of manufacture of claim 8, the processor to further perform operations including:
    sending control data to the projector to project the interactive display space in tandem with a display of the mobile computing device and to include content different and related to a content of the display of the mobile computing device.

13. A method comprising:
    receiving, via a sensor device included in a mobile computing device, a first image data of an area around the mobile computing device;
    analyzing the first image data to dynamically identify and select a projection surface included in the first image data of the area around the mobile computing device for projecting an interactive display space, including eliminating one or more projection surfaces from being selected based on a context of the user;
    determining a target area on the dynamically selected projection surface around the mobile computing device to project the interactive display space via a projector included in the mobile computing device, wherein a size of the target area is determined based, at least in part, on the first image data of the area around the mobile computing device;
    projecting the interactive display space onto the target area on the dynamically selected projection surface around the mobile computing device, wherein some user and object interactions within the projected interactive display space are to be processed via the mobile computing device, and wherein the interactive display space is projected in tandem with a display of the mobile computing device and includes content different and related to a content of the display of the mobile computing device;
    receiving, via the sensor device, a second image data of the projected interactive display space projected on the target area of the dynamically selected projection surface and an object within the target area and not included in the first image data, wherein interactions with the object within the projected interactive display space are not to be processed via the mobile computing device;
    analyzing the second image data of the projected interactive display space and the object not included in the first image data to determine surface properties of the target area of the dynamically selected projection surface and properties of the object; and
    calibrating the projection of the interactive display space for projecting onto the target area and the object based on the surface properties of the target area of the dynamically selected projection surface and the properties of the object not included in the first image data.

14. The method of claim 13, further comprising:
    receiving audio data from the sensor device; and
    determining the context of a user of the mobile computing device based, at least in part, on the audio data.

* * * * *